(12) United States Patent
Yu et al.

(10) Patent No.: US 10,412,034 B2
(45) Date of Patent: Sep. 10, 2019

(54) METHOD AND DEVICE FOR SELECTING NOTIFICATION RECIPIENT

(71) Applicant: Futurewei Technologies, Inc., Plano, TX (US)

(72) Inventors: Xin Yu, San Jose, CA (US); Van So Chau, Carlsbad, CA (US)

(73) Assignee: Futurewei Technologies, Inc., Plano, TX (US)

( * ) Notice: Subject to any disclaimer, the term of this patent is extended or adjusted under 35 U.S.C. 154(b) by 217 days.

(21) Appl. No.: 15/389,017

(22) Filed: Dec. 22, 2016

(65) Prior Publication Data

US 2018/0183744 A1    Jun. 28, 2018

(51) Int. Cl.
*H04L 12/00* (2006.01)
*H04L 12/58* (2006.01)

(52) U.S. Cl.
CPC ............ *H04L 51/20* (2013.01); *H04L 51/046* (2013.01)

(58) Field of Classification Search
CPC .............................. H04L 51/20; H04L 51/046
USPC .................................. 709/206, 223, 227, 228
See application file for complete search history.

(56) References Cited

U.S. PATENT DOCUMENTS

| 5,311,197 | A | * | 5/1994 | Sorden | B60R 25/102 |
| | | | | | 342/357.31 |
| 6,397,133 | B1 | * | 5/2002 | van der Pol | B60R 16/0233 |
| | | | | | 180/282 |
| 7,269,505 | B2 | * | 9/2007 | Zhao | G01C 21/3492 |
| | | | | | 340/539.13 |
| 7,283,045 | B1 | * | 10/2007 | Manz | G08B 21/0269 |
| | | | | | 340/506 |

(Continued)

FOREIGN PATENT DOCUMENTS

| CN | 104123835 A | 10/2014 |
| CN | 104732780 A | 6/2015 |

(Continued)

OTHER PUBLICATIONS

"Introduction to the Google Maps Roads API," https://developers.google.com/maps/documentation/roads/intro, total 4 pages, last updated Jul. 12, 2017.

(Continued)

*Primary Examiner* — Frantz Coby
(74) *Attorney, Agent, or Firm* — Fish & Richardson P.C.

(57) ABSTRACT

A method performed by a notification system for selecting notification recipients that are to receive abnormal event information. The method comprises storing abnormal event information including at least one of an event identifier, location, speed, direction and road information in a memory of the notification system; determining, by a processor of the notification system, a latest potential impacted area (PIA) based on the abnormal event information; creating a list of (Continued)

potential recipients within the latest PIA; selecting from the list of potential recipients a recipient to be notified according to a selection criterion specified in the memory, wherein the selection criterion is based on potential recipients information, including at least one of notification configuration, notification log, location, speed, direction and behavior history of the potential recipients; and sending, by a transmitter of the notification device, an abnormal event notification to the selected recipient.

25 Claims, 9 Drawing Sheets

(56) References Cited

U.S. PATENT DOCUMENTS

| | | | | |
|---|---|---|---|---|
| 7,421,334 | B2* | 9/2008 | Dahlgren | G07C 5/008 340/989 |
| 7,764,185 | B1* | 7/2010 | Manz | G08B 27/005 340/601 |
| 9,430,944 | B2* | 8/2016 | Grimm | H04L 67/22 |
| 10,089,868 | B1* | 10/2018 | Hayward | G08G 1/166 |
| 2005/0013417 | A1* | 1/2005 | Zimmers | G08B 27/005 379/37 |
| 2008/0316021 | A1* | 12/2008 | Manz | G06F 19/00 340/539.13 |
| 2009/0029672 | A1* | 1/2009 | Manz | G08B 27/005 455/404.2 |
| 2016/0144817 | A1* | 5/2016 | Chambers | B60R 21/0134 340/436 |

FOREIGN PATENT DOCUMENTS

| | | |
|---|---|---|
| CN | 104766488 A | 7/2015 |
| CN | 105489039 A | 4/2016 |
| WO | 2007120833 A2 | 10/2007 |

OTHER PUBLICATIONS

"Geocoding API, Getting Started," https://developers.google.com/maps/documentation/geocoding/start, total 7 pages, last updated Aug. 27, 2017.

"Place Details, Google Places API Web Service," https://developers.google.com/places/web-service/details, total 13 pages, last updated Oct. 12, 2017.

Wikipedia entry for AMBER Alert, https://en.wikipedia.org/wiki/AMBER_Alert, total 15 pages, last edited Nov. 11, 2017.

"How does Uber assign rides to drivers?" https://www.quora.com/Uber-company-When-a-customer-requests-for-a-Uber-ride-how-does-Uber-select-the-driver, total 2 pages, Aug. 17, 2016.

Voytek, "Optimizing a dispatch system using an AI simulation framework," https://newsroom.uber.com/semi-automated-science-using-an-ai-simulation-framework/, total 14 pages, Aug. 11, 2014.

Deena M. Amato-McCoy, "The Retail Beacon Technology Breakthrough," https://insights.samsung.com/2016/04/01/the-retail-beacon-technology-breakthrough/, total 4 pages, Apr. 1, 2016.

Wikipedia entry for iBeacon, https://en.wikipedia.org/wiki/IBeacon, total 7 pages, last edited Nov. 10, 2017.

* cited by examiner

US 10,412,034 B2

METHOD AND DEVICE FOR SELECTING NOTIFICATION RECIPIENT

TECHNICAL FIELD

The present invention relates generally to a notification system and method, and, in particular embodiments, to a system and method for selecting notification recipient.

BACKGROUND

Public safety is a big concern for people's daily life. Improvements in roadway and automobile designs have steadily reduced injury and death rates in developed countries. Nevertheless, auto collisions are still the leading cause of injury-related deaths. There are different types of dangerous situations that can cause automobile accidents. For instance, drunk drivers, police involve in high speed chases, emergency vehicles speeding to help others, and even reckless driving may cause life-threatening emergencies on road. As such, there is a need for a warning system for impacted individuals.

Some alert systems exist provide emergency notification over a large area. For example, America's Missing: Broadcast Emergency Response (AMBER) system is an alert system for child abductions. The AMBER alert system broadcasts, usually over the radio, any available information about a missing child and suspected vehicle information if available. An AMBER alert is automatically sent through the Wireless Emergency Alerts (WEA) program that broadcasts the alert to all WEA-enabled mobile devices within range of the cellular carrier towers in a large area without regard to the user's whereabouts. These alerts are often also broadcast over popular radio station to an entire city or county. Another example of existing large scale alert systems are government emergency alerts used for flood or severe weather alerts. These alert systems broadcast a message to all people in a large area indiscriminately and often warn people that are not affected and are therefore inefficient and annoying to people.

SUMMARY

The present disclosure provides a method and a system to selectively notify the recipient. This disclosure may be applied in a notification system, such as a cluster of cloud servers, an application installed on any mobile device, such as smart phone, tablet, smart vehicle, and so on.

In accordance with an aspect of the present disclosure, a method performed by a notification system is provided. The method comprises receiving and storing abnormal event information in a memory of the notification system, wherein the abnormal event information includes at least one of an event identifier, a location, a speed, a direction and road information; determining, by a processor of the notification system, a latest potential impacted area (PIA) based on the abnormal event information; creating, by the processor of the notification system, a list of potential recipients within the latest PIA; selecting from the list of potential recipients, by the processor of the notification system, at least one recipient to be notified according to a selection criterion specified in the memory, wherein the selection criterion is based on potential recipients information, including at least one of notification configuration, notification log, a location, a speed, a direction and behavior history of the potential recipients; and sending, by a transmitter of the notification device, an abnormal event notification to the selected recipient.

According to one implementation of the present disclosure, the method further comprising deciding whether the abnormal event has stopped; and sending a corresponding notification to the selected recipient.

According to one implementation of the present disclosure, the method further comprising setting a time interval; and updating the abnormal event information after the time interval.

According to one implementation of the present disclosure, wherein selecting a recipient to be notified from the list of potential recipients according to the selection criterion comprises selecting the recipient to be notified upon deciding that the potential recipient is configured to receive notification when the potential recipient is located within the latest PIA.

According to one implementation of the present disclosure, wherein selecting a recipient to be notified from the list of potential recipients according to the selection criterion comprises deciding whether the abnormal event is on highway based on the abnormal event information; deciding whether the potential recipient is on the same highway based on the potential recipients information upon deciding that the abnormal event is on highway; and selecting the recipient to be notified upon deciding that the potential recipient is on the same highway.

According to one implementation of the present disclosure, wherein selecting a recipient to be notified from the list of potential recipients according to the selection criterion comprises deciding whether the abnormal event is on local way based on the abnormal event information; deciding whether the potential recipient is driving based on the potential recipients information upon deciding that the abnormal event is on a local road; and selecting the recipient to be notified upon deciding that the potential recipient is driving.

According to one implementation of the present disclosure, wherein selecting a recipient to be notified from the list of potential recipients according to the selection criterion comprises deciding whether the potential recipient is in a place based on the information related with the potential recipient upon deciding that the potential recipient is not driving; and selecting the recipient to be notified upon deciding that the potential recipient is not in a place.

According to one implementation of the present disclosure, wherein selecting a recipient to be notified from the list of potential recipients according to the selection criterion comprises deciding whether the potential recipient is about to leave the place according to whether the place is a long stay place and the behavior history of the potential recipient upon deciding that the potential recipient is in a place; and selecting the recipient to be notified upon deciding that the potential recipient is about to leave the place.

According to one implementation of the present disclosure, wherein selecting a recipient to be notified from the list of potential recipients according to the selection criterion comprises checking the location of the potential recipient periodically upon deciding that the potential recipient is not about to leave; and updating the latest PIA upon deciding that the potential recipient is out of the place; deciding whether the potential recipient is in the updated latest PIA; and selecting the recipient to be notified upon deciding that the potential recipient is in the latest PIA.

According to one implementation of the present disclosure, wherein selecting a recipient to be notified from the list of potential recipients according to the selection criterion comprises setting a timer; and updating the location of the potential recipient periodically before the time expires.

According to one implementation of the present disclosure, the method further comprises calculating a Effective Impacted Area (EIA) upon deciding that the potential recipient is neither driving nor in a place; and creating a list of potential recipients within the PIA comprises creating a list of potential recipients within the EIA.

According to one implementation of the present disclosure, the method further comprises sending, by the transmitter of the notification system, the abnormal event notification to a secondary receipt associated with the selected recipient.

According to one implementation of the present disclosure, wherein the location information is received from a GPS (Global Positioning System).

In accordance with an aspect of the present disclosure, a notification system is provided. The notification system comprises a non-transitory memory storage comprising instructions and an abnormal event information, wherein the abnormal event information includes at least one of an event description or identifier, a location, a speed, a direction and road information; and one or more processors in communication to the memory, wherein the one or more processors execute the instructions to determine a latest potential impacted area (PIA) based on the abnormal event information; create a list of potential recipients within the latest PIA; and select recipients to be notified from the list of potential recipients according to a selection criterion, wherein the selection criterion is based on the potential recipients information, including at least one of notification configuration, notification log, a location, a speed, a direction and behavior history of the potential recipients stored in the non-transitory memory storage; and a transmitter in communication with the one or more processors, wherein the transmitter transmits an abnormal event notification to the selected recipient.

According to one implementation of the present disclosure, wherein the one or more processors further execute the instructions to decide whether the abnormal event has stopped; and the transmitter transmits a corresponding notification to the selected recipients.

According to one implementation of the present disclosure, wherein the one or more processors further execute the instructions to set a time interval; and update the abnormal event information after the time interval.

According to one implementation of the present disclosure, wherein the instruction to select recipients to be notified from the list of potential recipients according to a selection criterion comprises the instruction to select the potential recipient to be notified upon deciding that the potential recipient is configured to receive notifications when the potential recipient is located within the latest PIA.

According to one implementation of the present disclosure, wherein the instruction to select recipients to be notified from the list of potential recipients according to a selection criterion comprises the instruction to decide whether the abnormal event is on highway based on the abnormal event information; decide whether the potential recipient is on the same highway based on the potential recipients information upon deciding that the abnormal event is on highway; and select the potential recipient to be notified upon deciding that the potential recipient is on the same highway.

According to one implementation of the present disclosure, wherein the instruction to select recipients to be notified from the list of potential recipients according to a selection criterion comprises the instruction to decide whether the abnormal event is on local way based on the abnormal event information; decide whether the potential recipient is driving based on the potential recipients information upon deciding that the abnormal event is on local way; and select the potential recipient to be notified upon deciding that the potential recipient is driving.

According to one implementation of the present disclosure, wherein the instruction to select recipients to be notified from the list of potential recipients according to a selection criterion comprises the instruction to decide whether the potential recipient is in a place based on the potential recipients information upon deciding that the potential recipient is not driving; and select the potential recipient to be notified upon deciding that the potential recipient is not in a place.

According to one implementation of the present disclosure, wherein the instruction to select recipients to be notified from the list of potential recipients according to a selection criterion comprises the instruction to decide whether the potential recipient is about to leave the place according to whether the place is a long stay place and the behavior history of the potential recipient upon deciding that the potential recipient is in a place; and select the potential recipient to be notified upon deciding that the potential recipient is about to leave the place.

According to one implementation of the present disclosure, wherein the instruction to select recipients to be notified from the list of potential recipients according to a selection criterion comprises the instruction to check the location of the potential recipient periodically upon deciding that the potential recipient is not about to leave; and update the latest PIA upon deciding that the potential recipient is out of the place; decide whether the potential recipient is in the updated latest PIA; and select the potential recipient to be notified upon deciding that the potential recipient is in the latest PIA.

According to one implementation of the present disclosure, wherein the instruction to select recipients to be notified from the list of potential recipients according to a selection criterion comprises the instruction to set a timer; and update the location of the potential recipient periodically before the time expires.

According to one implementation of the present disclosure, wherein the one or more processors further execute the instructions to calculate an Effective Impact Area (EIA) based on the abnormal event information; and retrieve a list of potential recipients within the EIA.

According to one implementation of the present disclosure, wherein the transmitter further transmits the warning notification to a secondary recipient associated with the selected recipient.

According to one implementation of the present disclosure, wherein the location information is received from a GPS (Global Positioning System).

In accordance with an aspect of the present disclosure, a method performed by a user equipment is provided. The method comprises storing abnormal event information in a memory of the user equipment, wherein the abnormal event information includes at least one of an event identifier, a location, a speed, a direction, a potential impacted area (PIA) and road information; deciding, by the processor of the user equipment, whether to display an abnormal event notification according to a selection criterion specified in the memory, wherein the selection criterion is based on user equipment's information, including at least one of notification configuration, notification log, a location, a speed, a direction and behavior history of the potential recipients; and displaying on a screen, by the user equipment, the abnormal event notification upon deciding to display the abnormal event notification according to the selection criterion.

According to one implementation of the present disclosure, wherein deciding whether to display an abnormal event notification according to a selection criterion comprises deciding to display the abnormal event notification if the user equipment is configured to receive notification when the user equipment is located within the latest PIA.

According to one implementation of the present disclosure, wherein deciding whether to display an abnormal event notification according to a selection criterion comprises deciding whether the abnormal event is on highway based on the abnormal event information; deciding whether the user equipment is on the same highway based on the user equipment's information upon deciding that the abnormal event is on highway; and deciding to display the abnormal event notification if the user equipment is on the same highway.

According to one implementation of the present disclosure, wherein deciding whether to display an abnormal event notification according to a selection criterion comprises deciding whether the abnormal event is on local way based on the abnormal event information; deciding whether user of the user equipment is driving based on the user equipment's information upon deciding that the abnormal event is on a local road; and deciding to display the abnormal event notification if user of the user equipment is driving.

According to one implementation of the present disclosure, wherein deciding whether to display an abnormal event notification according to a selection criterion comprises deciding whether the user equipment is located in a place based on the user equipment's information upon deciding that the user of the user equipment is not driving; and deciding to display the abnormal event notification if the user equipment is not located in a place.

According to one implementation of the present disclosure, wherein deciding whether to display an abnormal event notification according to a selection criterion comprises deciding whether user of the user equipment is about to leave the place according to whether the place is a long stay place and the behavior history of user of the user equipment upon deciding that the potential recipient is in a place; and deciding to display the abnormal event notification if user of the user equipment is about to leave the place.

According to one implementation of the present disclosure, wherein deciding whether to display an abnormal event notification according to a selection criterion comprises checking the location of the user equipment periodically upon deciding that the user of the use equipment is not about to leave; and receiving the latest PIA upon deciding that the user equipment is out of the place; deciding whether the user equipment is in the updated latest PIA; and deciding to display the abnormal event notification if user of the user equipment is in the latest PIA.

According to one implementation of the present disclosure, wherein deciding whether to display an abnormal event notification according to a selection criterion comprises setting a timer; and updating the location of the user equipment periodically before the time expires.

According to one implementation of the present disclosure, the method further comprises sending, a secondary receipt configuration to a notification system.

According to one implementation of the present disclosure, wherein the information of location is received from a GPS (Global Positioning System).

In accordance with an aspect of the present disclosure, an user equipment is provided. The user equipment comprises a non-transitory memory storage comprising instructions and an abnormal event information, wherein the abnormal event information includes at least one of an event description or identifier, a location, a speed, a direction, a potential impacted area (PIA) and road information; and one or more processors in communication with a screen and to the memory, wherein the one or more processors execute the instructions to display, on the screen, an abnormal event notification according to a selection criterion specified in the memory, wherein the selection criterion is based on user equipment's information, including at least one of notification configuration, notification log, a location, a speed, a direction and behavior history of the potential recipients.

According to one implementation of the present disclosure, wherein the instruction to display an abnormal event notification comprises the instruction to display an abnormal event notification upon deciding that the user equipment is configured to receive notifications when the user equipment is located within the latest PIA.

According to one implementation of the present disclosure, wherein the instruction to display an abnormal event notification comprises the instruction to decide whether the abnormal event is on highway based on the abnormal event information; decide whether the user equipment is on the same highway based on the user equipment's information upon deciding that the abnormal event is on highway; and display an abnormal event notification upon deciding that the potential recipient is on the same highway.

According to one implementation of the present disclosure, wherein the instruction to display an abnormal event notification comprises the instruction to decide whether the abnormal event is on local way based on the abnormal event information; decide whether user of the user equipment is driving based on the user equipment's information upon deciding that the abnormal event is on local way; and display an abnormal event notification upon deciding that user of the user equipment is driving.

According to one implementation of the present disclosure, wherein the instruction to display an abnormal event notification comprises the instruction to decide whether the user equipment is located in a place based on the user equipment's information upon deciding that user of the user equipment is not driving; and display an abnormal event notification upon deciding that user of the user equipment is not in a place.

According to one implementation of the present disclosure, wherein the instruction to display an abnormal event notification comprises the instruction to decide whether the user of the use equipment is about to leave the place according to whether the place is a long stay place and the behavior history of the user of the user equipment upon deciding that the user equipment is located in a place; and display an abnormal event notification upon deciding that the user of the user equipment is about to leave the place.

According to one implementation of the present disclosure, wherein the instruction to display an abnormal event notification comprises the instruction to check the location of the user equipment periodically upon deciding that the user of the user equipment is not about to leave; and receive the latest PIA upon deciding that the user equipment is out of the place; decide whether the user equipment is in the updated latest PIA; and display an abnormal event notification upon deciding that the user equipment is in the latest PIA.

According to one implementation of the present disclosure, wherein the instruction to display an abnormal event notification comprises the instruction to set a timer; and update the location of the potential recipient periodically before the time expires.

According to one implementation of the present disclosure, wherein a transmitter in communication with the one or more processors transmits a secondary recipient configuration to a notification system.

According to one implementation of the present disclosure, wherein the location is received from a GPS (Global Positioning System).

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the invention, and do not limit the scope of the invention.

In various embodiments, the present disclosure provides methods for selecting notification recipients for a particular alert. The notification system selects recipients for receiving an alarm or warning notification according to a selection rule. As such, by using an intelligent selection process, a much more constricted group of people are selected and notified. The selected recipients thus actually are within an impacted geographical area. This transmission to selected recipients is more efficient and will reduce the annoyance caused by group notification without selection.

In one embodiment, the recipient selection notification method may be applied in a notification system formed by a cluster of cloud servers. It may or may not correspond to or be a part of a public security notification system. It also exists independently from any smart vehicle or mobile device. The notification system may decide whether to send the notification regarding an abnormal event, for example, detection of a drunk driver, a high speed police chase, emergency vehicles traveling at a high speed in relation to a potential recipient, i.e. a user equipment such as a smart vehicle or a mobile device, which has previously registered as a user of the notification system.

According to another embodiment, the recipient selection method may be applied in an application running on UE such as a smart vehicle or a mobile device, the application decides whether to display the warning message regarding the abnormal event to the user.

Figure 1A:
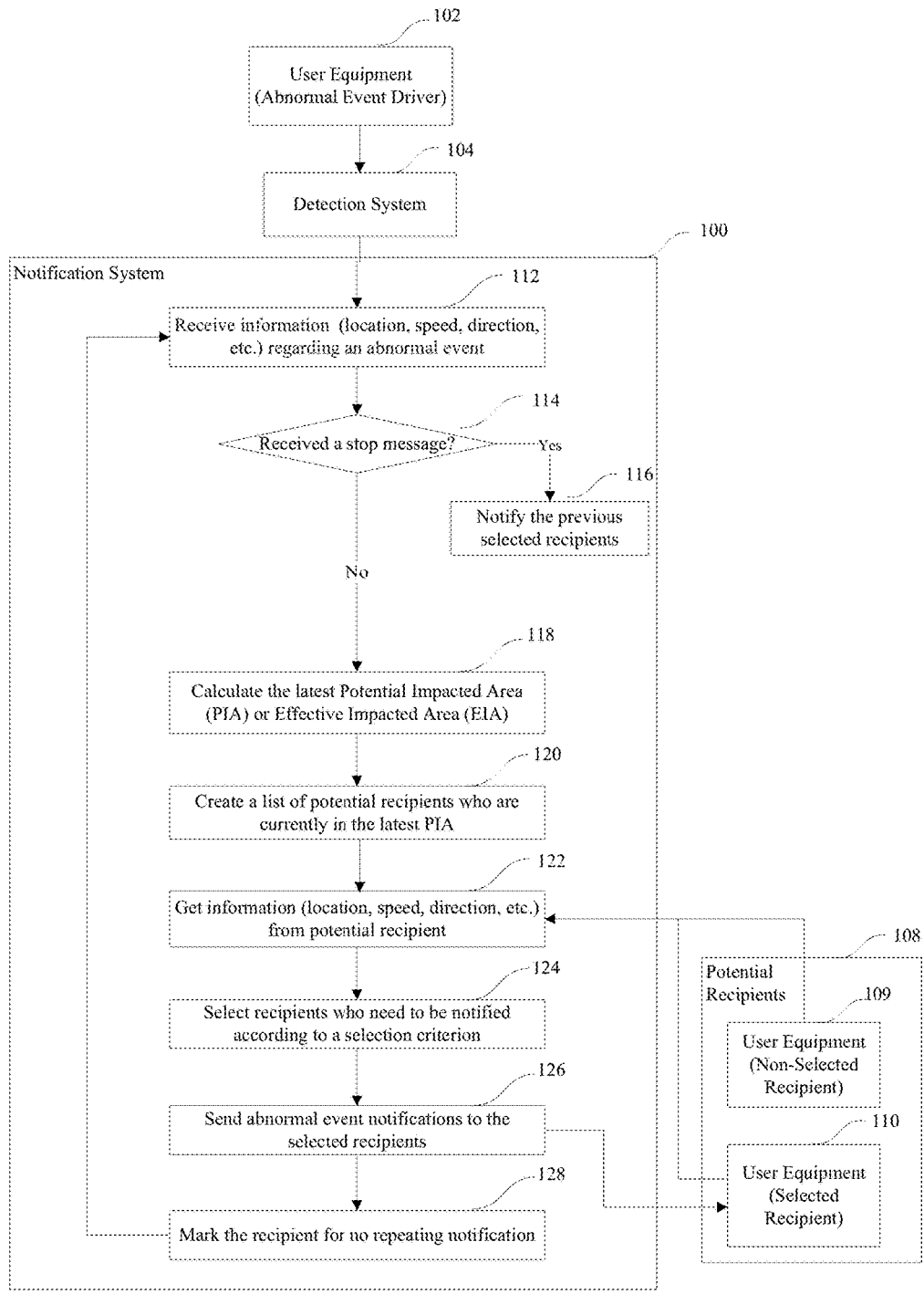
FIG. 1A illustrates a flow charts of a notification method according to an embodiment of the present disclosure.

FIG. 1A illustrates a flow chart of a notification method according to an embodiment of the present disclosure. Wherein the recipient selection method is performed in a notification system 100 including a group of servers which provides a cloud service to potential recipients 108 including smart cars and mobile devices. Notification system 100 is a cloud based server in one embodiment. In another embodiment, a portion of notification system 100 is disposed as a part of the smart cars and mobile devices and a remote server/network is utilized for distributing alerts associated with the embodiments of the invention.

As illustrated in FIG. 1A, user equipment 102 may be a smart car or a mobile device of a driver that is operating the vehicle in a manner that is either erratic or dangerous thereby causing an abnormal event. The user equipment (UE) 102 periodically sends information about its speed, direction and location to a detection system 104, which may be a group of servers providing abnormal event detection cloud service. Alternatively, detection system 104 may be disposed within the vehicle and in communication with the UE 102 or even be constructed as a logic circuit or block (or processor) as a part of the UE 102. The speed, direction may be detected by built-in sensors of the UE or a third party device, for example an Event Data Recorder (EDR), the location information may be obtained from a Global Positioning System (GPS) that are in communication with the UE 102. After receiving the information above, the detection system 104 will decide whether an abnormal driving event is occurring or has been detected. The decision can be made according to a detection algorithm based on one or more of the speed, direction, and location information of the UE 102.

According to one embodiment of the present disclosure, when the driving speed exceeds a threshold or a threshold in relation to a known speed limit or only when the driving direction has a deviation exceeding a certain angle, will it be decided that an abnormal event is happening or has been detected. For example, if the driving direction of the user equipment erratically changes, such as zigzag, the detection system 104 may determine that the driver is driving similarly to someone under the influence of alcohol or a drug; if the driving speed is 20 miles/hour more than the speed limit, the detection system may determine that the driving speed is either reckless or merely dangerous enough to warn others (for example, a police car chasing a criminal or an emergency vehicle are speeding for legitimate reasons or an individual is driving recklessly). Once the detection system 104 decides that an abnormal driving event is occuring, it will send the user equipment 102's information, including one or more of speed, direction, location as well as an event ID or event description to a notification system 100. Once the detection system 104 decides that an abnormal driving ceased to occur, it will send a stop or corresponding message to the notification system 100 At step 112, the notification system 100 receives the related information regarding an abnormal event from the detection system 104 or, alternatively, from the UE 102. The related information regarding the abnormal event is stored in a memory of the notification system 100. The notification system 100 may be part of the detection system 104 or may be an independent system working with the detection system 104.

The information received by the notification system 100 may include a message that indicates the cessation of the abnormal event. At step 114, the notification system 100 detects whether the information received from the detection system 104 includes a stop or corresponding message. If yes and if there is previously selected recipient 106, at step 116, i.e. the notification system 100 sends a stop or corresponding notification to the previously selected recipient. For the first cycle, i.e. at the onset of abnormal event, steps 114 and 116 may be ignored.

If the notification system decides that the abnormal event is not stopped yet and a notification needs to be sent out, at step 118, a Potential Impacted Area (PIA) or an Effective Impacted Area (EIA) is calculated according to the related information of the abnormal event driven vehicle, including location, direction and/or speed of the abnormal event driven vehicle. For example, the PIA may be calculated as a circle with the abnormal event driver's location as center and a certain distance as radius. Please note, the circle shape is only one example, the PIA could be any shape depending on the calculation method of the notification system 100, the location, and/or the abnormal event type. The PIA may also be adjusted to an Effective Impacted Area (EIA) which will be discussed in FIG. 6 or 7.

At step 120, a list of potential recipients 108 is created according to the PIA or EIA. There are different ways to create the list of the potential recipients 108. The potential recipients 108 include user equipment that will not be notified 109 and user equipment that will be notified 110. According to one embodiment of the present disclosure, the potential recipients' device IDs are retrieved from base stations. The notification system 100 may send the information of PIA or EIA to a cloud service which includes one or more servers and has knowledge of all base stations' location. The cloud service calculates and decide the base station(s) that serves the PIA or EIA and retrieves all device identifications (IDs) covered by the base stations. A list of the device IDs is sent from the cloud service to the notification system 100. After receiving the list of the device IDs, the notification system 100 may query users from an internal database of registered users according to the list of device IDS and creates a list of the potential recipients 108.

According to another embodiment of the present disclosure, the notification system user periodically uploads location information to the notification system 100 and the location information is saved or updated into database of user locations in the notification system. The notification system 100 queries users from the database according to the PIA or EIA as well as the user's location information in the database. Then, the notification system 100 creates a list of the potential recipients 108 located within the PIA or EIA. The database of the notification system 100 may include tables comprising information about the notification system user. The information may include user ID, device ID, location, notification configuration (always notify or not), secondary recipient configuration (secondary recipient's user ID and/or device ID), notification log, and/or behavior history of a certain place (whether the potential recipient will stay for an extended period of time at a certain place, such as an office, a shopping center, a residential place or the potential recipient will stay briefly at a place, such as a gas station, a coffee shop), etc.

After creating the list of the potential recipients 108, at step 122, the notification system 100 receives information from the potential recipients 108. The information may include one or more of the potential recipients' location, speed, direction, road information, notification configuration (always notify or not), secondary recipient configuration (secondary recipient's user ID and/or device ID), notification log, and/or behavior history of a certain place, etc.

According to the information associated with the abnormal event received at step 112 and the information of the potential recipients received at step 122, the notification system 100 selects a recipient who needs to be notified according to a selection criterion, i.e. step 124. This step will be described in details later. Some examples of the selection criterion will be discussed in FIGS. 2-4.

At step 126, an abnormal event notification, i.e. a warning message and/or an alarm, is sent out to the selected recipient 110 by the notification system 100. This warning message may include the event description or event ID, the event location, direction, speed and/or other necessary information. The abnormal event notification received by a selected recipient 110 may be further processed and visualized by a map embedded in the notification application installed on the selected recipient's mobile device or smart car. For example, the abnormal event is able to display on map by some Application Program Interfaces (APIs), for example Google® Map API, without map application installed.

At step 128, the notification system 100 may mark the selected recipient 110 with event ID so that the selected recipient will recognize multiple communications regarding the same event. After marking the selected recipient, the notification system waits for a time interval and goes back to step 112 to process the updated information about the abnormal event. For example, a drunk driving vehicle may have been moved to a new area or the drunk driving vehicle may have been stopped by a police car. Base on the updated information of the abnormal event and the updated PIA/EIA, an updated list of the potential recipients will be created, the selected recipients will be updated according to the selection criterion and the notification system 100 only sends notification to those updated selected recipient that have not been notified previously. The step of updating the list of potential recipients can include removing the potential recipients if the abnormal event is no longer occurring or is no longer being detected.

Figure 1B:
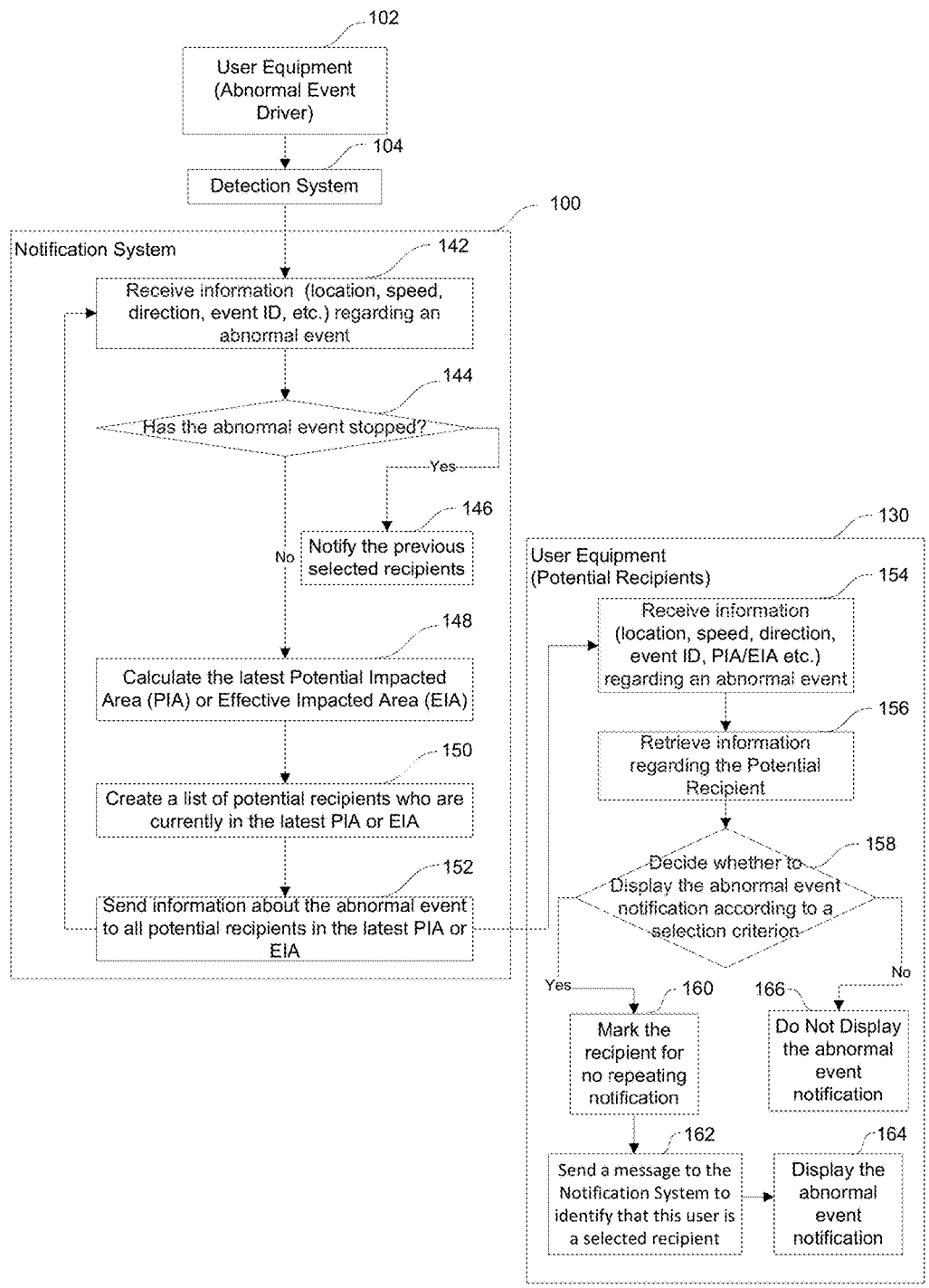
FIG. 1B illustrates a flow charts of a notification method according to another embodiment of the present disclosure.

FIG. 1B illustrates a flow chart of a notification method according to another embodiment of the present disclosure wherein the recipient selection method is performed in user equipment 130.

As illustrated in FIG. 1B, user equipment 102 may be a smart car or a mobile device of a driver causing an abnormal event. The equipment periodically sends information about its speed, direction and location information to a detection system 104, which may be a group of servers providing cloud service. The speed, direction may be detected by built-in sensors of the user equipment or a third party device, for example an Event Data Recorder (EDR), the location information may be obtained from a Global Positioning System (GPS). Alternatively, user equipment 102 may merely include software instructions for communicating with a GPS to calculate location, speed and direction information thereby not requiring sensors. This alternative approach should be considered in each embodiment below that reference sensors for determining such parameters.

After receiving the information above, the detection system 104 will decide whether an abnormal driving event is occurring. The decision can be made according to a detection algorithm based on one or more of the speed, direction, location information of the user equipment 102. According to one embodiment of the present disclosure, only when the driving speed exceeds a certain limit and/or the driving direction has a deviation exceeding a certain angle, will it be decided that an abnormal event is happening. Once the detection system 104 decides that an abnormal driving event is occurring, it will send the user equipment 102's information, including one or more of speed, direction, location as well as an event ID or event description to a notification system 100. Once the detection system 104 decides that an abnormal driving has ceased to occur, it will send a stop or corresponding message to the notification system 100. The user equipment 102 may be part of the detection system 104, or the user equipment 102 may be independent from the detection system 104.

At step 142, a notification system 100 receives the related information regarding an abnormal event from the detection system 104. The related information regarding the abnormal event is stored in a memory of the notification system. The notification system 100 may be part of the detection system 104 or may be an independent system working with the detection system 104.

The information received by the notification system 100 may include a message that indicates the cessation of the abnormal event. At step 144, the notification system 100 detects whether the information received from the detection system 104 includes a stop or corresponding message. If yes and if there is previously selected recipients, at step 146, i.e. the notification system 100 sends a stop or corresponding notification to the previously selected recipient(s). For the first cycle, i.e. at the onset of abnormal event, steps 144 and 146 may be ignored.

If the notification system decides that the abnormal event is continuing based on there being recent sensor data that indicates operation above at least one specified threshold and that a subsequent notification needs to be sent out, at step 148, a Potential Impacted Area (PIA) or an Effective Impacted Area (EIA) is calculated or updated according to the related information of the abnormal event driven vehicle, including location, direction and/or speed of the abnormal event driven vehicle. For example, the PIA may be calculated as a circle with the abnormal event driver's location as center and a certain distance as radius. Please note, the circle shape is only one example, the PIA could be any shape depending on the calculation method of the notification system 100, the location, and/or the abnormal event type. The PIA may also be adjusted to an Effective Impacted Area (EIA) which will be discussed in FIG. 6 or 7. Furthermore, in one embodiment, the EIA may be determined in conjunction with mapping software to define an EIA that is merely along a road or highway.

At step 150, a list of potential recipients 130 is created according to the PIA or EIA. There are different ways to create the list of the potential recipients 130. Similar examples have been discussed in step 120 as illustrated in FIG. 1A.

After creating the list of the potential recipients 130, at step 152, the notification system 100 sends information regarding the abnormal event to all the potential recipients 130. This information may include the event description or event ID, the event location, direction, speed and/or other necessary information. The information of the abnormal event received by the potential recipients 130 may be further processed and visualized by a map embedded in the notification application installed on the selected recipient's mobile device or smart car. After a time interval, the notification system 100 will go back to step 142 to receive the information regarding the abnormal event periodically.

After a potential recipient 130, i.e. user equipment such as mobile device or smart car, receives the information about the abnormal event information at step 154, the potential recipient 130 retrieves the information of its own, step 156. The retrieved information includes location, speed, direction, road information, notification configuration (always notify or not), secondary recipient configuration (secondary recipient's user ID and/or device ID), notification log, and/or behavior history of a certain place, etc. This information may be received from built-in sensors of the potential recipients or a third party device, for example an EDR or a GPS or even calculated by an application in a device that communicates with GPS satellites.

At step 158, according to the information of the abnormal event received at step 154 and the information of the potential recipients retrieved at step 156, the potential recipient 130 decides whether to display the abnormal event notification received from the notification system 100 according to a selection criterion. This step will be described in details later. Some examples of the selection criterion will be discussed in FIGS. 2-4.

If the potential recipient 130 is selected as recipient to be notified, the abnormal event notification will be displayed on user's equipment. At step 160, the selected recipient is marked with the event ID so that it will not display the same notification of the same event. At step 162, the selected recipient sends a message to the Notification System 100. The message may include a user ID and/or device ID, so that the Notification System 100 can identify that the user equipment with the same user ID or device ID is a selected recipient and record this in the database. Also, the Notification System 100 may retrieve other information, including location, notification configuration, secondary recipient configuration, notification log, and/or behavior history of the selected recipient. At step 164, the abnormal event notification will be displayed on the screen of the user equipment 130 of the selected recipient. The order of steps 160, 162 and 164 is interchangeable.

If the potential recipient 130 is not selected as a recipient to be notified, at step 164, the abnormal event notification will not be displayed on the screen of the user equipment 130.

Figure 2:
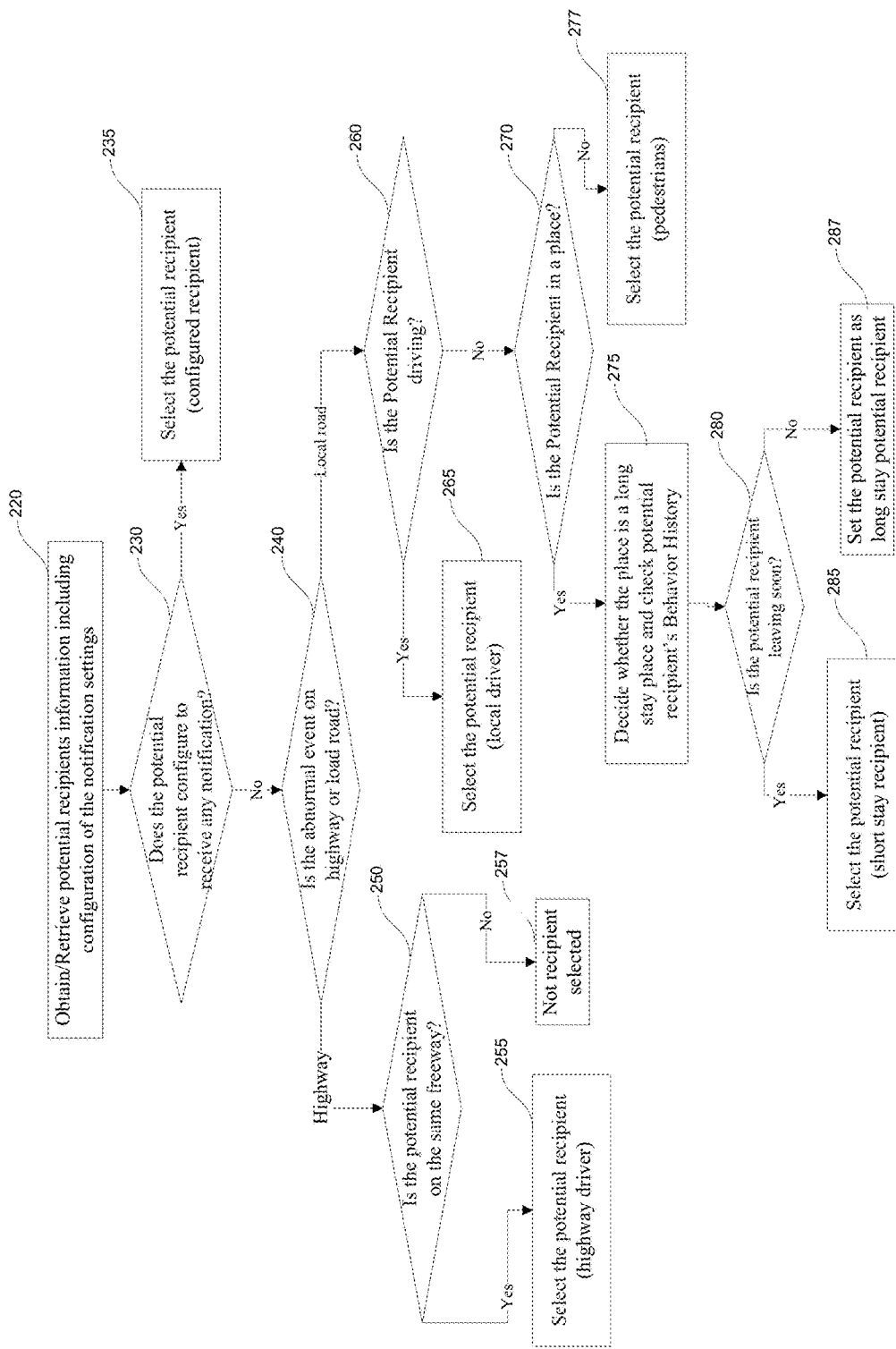
FIG. 2 illustrates an example selection criterion according to an embodiment of the present disclosure.

FIG. 2 illustrates an example selection criterion according to an embodiment of the present disclosure. As discussed before, the notification system 100 received information about the abnormal event from the detection system 104 at step 112 or 142 in FIG. 1A or 1B, respectively.

At step 220, the notification system 100 receives and/or retrieves the potential recipients' information, or the potential recipients 130 retrieve their own information from their devices. The information may include a notification log. Any notification will be logged and stored into Notification Log table along with user ID, device ID and event ID in a database of the notification system 100. The notification log maybe queried from the Notification Log table by user ID, device ID and event ID to check if the potential recipient has received the notification of this event before. If a record is found, it means the potential recipient is a previously selected recipient and should not be notified for the same event again. The information may also include a notification configuration. The notification configuration defines whether the potential recipient always wants to receive a notification. The notification configuration can be queried from a User Configuration table of the database. The information may also include one or more of location, speed, direction, road information, secondary recipient configuration (secondary recipient's user ID and/or device ID) and/or behavior history of a certain place (whether the potential recipient will stay for an extended period of time at a certain place, such as an office, a shopping center, a residential place or the potential recipient will stay briefly at a place, such as a gas station, a coffee shop), etc. associated with each potential recipient.

At step 230, the notification system decides whether to select or identify the potential recipient based on the potential recipient's notification configuration. Once the potential recipient's notification configuration is "on", i.e. the potential recipient is to receive any alert or warning notification as long as he/she is within the PIA of an abnormal event. The next step is to select the potential recipient to be notified, i.e. step 235. These selected recipients may be marked as configured recipients. Otherwise, if the potential recipient did not set the alert receiving configuration "on", go to step 240.

At step 240, the next step is to decide whether the abnormal event has happened on a highway or a local road based on the location information of the abnormal event. The event location information according to its GPS is received from the detection system 140. The specific address or road name may be derived from the location information as well. Some example applications deciding the specific address of road information include Google® Application Program Interfaces (APIs), such as Google® Reserve Geocoding Application Program Interface (API) and Google® Places API. For example, Google® Reverse Geocoding API converts geographic coordinates into an address and can find the address for a given place ID. Google® Places API may use place ID to obtain more information on location including the place type. Some examples are given in FIGS. 5A-5D. Please note Google® APIs are just some example APIs used to recognize place type information. There might be other third party APIs that can provide place information according to location coordinates.

If the abnormal event happened on a high way, freeway, toll way, expressway, or other highway that does not have traffic lights, intersections and direct access (collectively, high speed highway), the next step is, at step 250, to compare the location information of potential recipient located on the high speed highway with the location of the abnormal event in a manner that accounts for closing speed as well as proximity. If the potential recipient is on the same high speed highway and is within a specified closure rate, the method includes, at step 255, the step of selecting the potential recipient to be notified. These selected recipients may be marked as high speed highway drivers. Otherwise, if the potential recipient is not on the same high speed highway, at step 257, the step includes not selecting the potential recipient to be notified.

If the abnormal event has not happened on a highway, but instead has happened on a local road, one that includes traffic lights, intersections, pedestrians, and property access on the road within a certain range, the method includes, at step 260, deciding whether the potential recipient should be in the latest PIA based on the driving based and/or direction information of the potential recipient. For example, if the speed of the potential recipient is more than a certain rate, e.g. 15 miles/hour, it may be determined by logic of that the potential recipient is driving. Then, the potential recipient is selected to be notified at step 265. These selected recipients may be marked as local drivers.

If the potential recipient is decided as not driving, then the potential recipient may either being as a pedestrian on a road or someone staying in a place. At step 270, decide whether the potential recipient is staying in a place based on the location, speed and/or direction information of the potential recipient. According to one embodiment of the present disclosure, Google® APIs can decide that the potential recipient is on a local road, or staying at a gas station, a coffee shop, or in a company office. If the potential recipient is decided as staying in a place, go to step 275. Otherwise, the potential recipient on the road is selected to be notified at step 277. And these selected recipients may be marked as pedestrians.

At step 275, according to the place ID and the place type, as well as the potential recipient's behavior history to decide whether the place is a long stay place for the potential recipient. At step 280, decide whether the potential recipient is going to leave soon. According to one embodiment of the present disclosure, if the place is usually a long stay place, for example, a company office or a residential place, the potential recipient may stay longer for an extended period of time and not leave soon; but for a short stay place, for example a gas station, the potential recipient may leave in a few minutes; and for an uncertain place like a coffee shop, the potential recipient may leave soon or stay longer depending on their behavior history. For example, the potential recipient may usually buy a coffee and leave soon or he or she may stay in the coffee shop for a long period for reading or meeting with friends. The potential recipient's behavior history may be collected by the potential recipient's mobile device, for example a mobile phone, transmitted and analyzed by the notification system server side. Or the potential recipient's behavior history is available from a third party API. According to the potential recipient's behavior history retrieved from either a cloud service or a third party API, the notification system decides whether the potential recipient is about to leave. If yes, at step 285, select the potential recipient to be notified, and the selected recipient may be marked as short stay recipient; otherwise, at step 287, mark the potential recipient as a long stay potential recipient, the scenario to process the notification for the long stay potential recipient is described later in FIG. 3.

Figure 3:
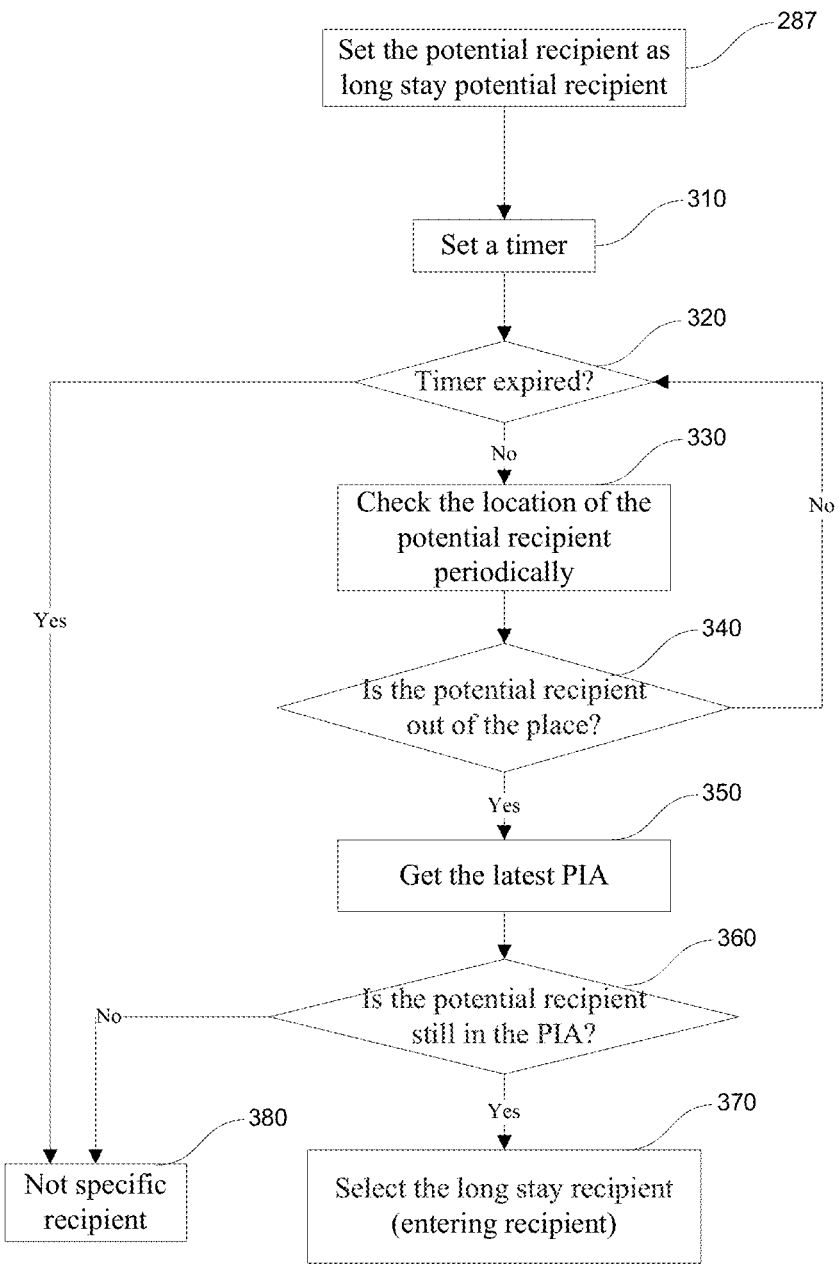
FIG. 3 illustrate a flow chart of notification processing for a long stay potential recipient according to one embodiment of the present disclosure.

FIG. 3 illustrate a flow chart of notification processing for a long stay potential recipient according to one embodiment of the present disclosure. As illustrated in FIG. 2, the potential recipient is decided as a long stay potential recipient at step 287, for example he or she is staying in a company office. At step 310, set a timer for the long stay potential recipient, depending on the abnormal event type, the timer may be several minutes or even longer. The step 310, setting up a timer, is optional to this method. The timer is to periodically check any location change of the potential recipient. The purpose of this timer is to ensure the long stay potential recipient is able to receive a notification if he/she leaves within the timer period. Another purpose of this timer is to limit the period and/or times to detect and/or update the long stay potential recipient's location and other information to reduce the power consumption of the long stay potential recipient's mobile device. For example, if the long stay potential recipient stays in the office for a few hours, it may only monitor his/her location for about a few minutes during a drunk driving event, which may affect the area for less than that time.

At step 320, check whether the timer has expired. If not, at step 330, check the location of the long stay potential recipient periodically. The time period to check the long stay potential recipient's location should be shorter than the timer set up in step 310. One way to check if the long stay potential recipient's location is changed is that translating the GPS location to place type and comparing the current place type to the previous one. If the place type is changed, then it means the location is changed. Potential recipient's GPS information is available from user equipment. Place type can be retrieved from a third party API with GPS information as one of the parameters, for example.

At step 340, decide whether the long stay potential recipient is out of the place according to the long stay potential recipient's location information, for example decide whether the long stay potential recipient has moved out of the company office.

If the long stay potential recipient is detected as out of the place, for example the long stay potential recipient has moved out to a garage or walk out on a street, go to step 350, to receive the latest potential impacted area (PIA) of the abnormal event.

Otherwise, if the long stay potential recipient is still in the place, go back to step 320 to check whether the timer is done. If the timer has expired and potential recipient's location is not changed, then the potential recipient should not receive notification.

At step 360, compare the long stay potential recipient's location and the latest PIA to decide whether the long stay potential recipient is in the latest PIA. If yes, select the long stay potential recipient to be notified at step 370, this selected recipient may be marked as entering recipient, i.e. from the long stay place to the PIA; otherwise, at step 380, do not notify the long stay potential recipient.

For a selected recipient, according to an embodiment of the present disclosure, one or more secondary recipients may be set up. This is especially useful when the primary recipient is a child. His/her parents can be set up as the secondary recipients, when abnormal event happens, not only the child will be notified, but also the parents.

Figure 4:
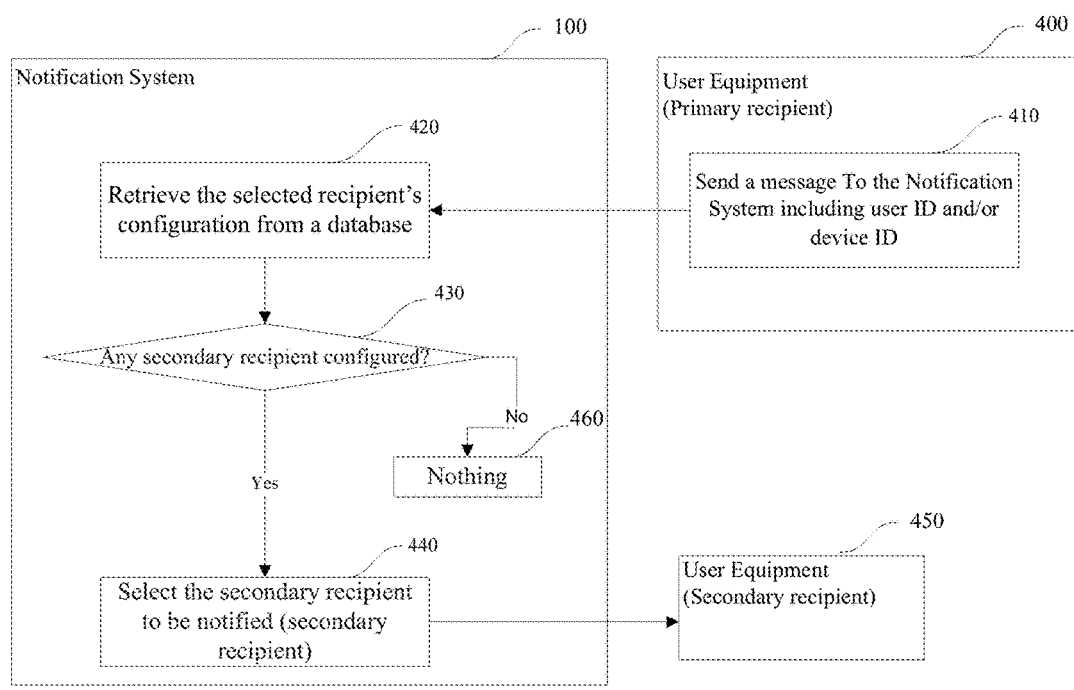
FIG. 4 illustrated a flow chart of notification processing for a secondary recipient configured by a recipient according to one embodiment of the present disclosure.

FIG. 4 illustrated a flow chart of notification processing for a secondary recipient configured by a recipient according to one embodiment of the present disclosure. Once the user equipment 400 is decided to be notified as a primary recipient, according to one embodiment of the present disclosure, i.e. the recipient selection method is performed in notification system 100, step 410 may be ignored. At step 420, the notification system 100 will retrieve information of secondary recipients by primary recipient's user ID from a database of the notification system configured by the selected recipient. According to another embodiment of the present disclosure, the recipient selection method is performed in the user equipment. Once the user equipment is decided to display the abnormal event notification, the user equipment 400 will send a message to the notification system 100 at step 410. The message includes a user ID, a device ID and event ID. After receiving the message including the user ID, the device ID and event ID, at step 42o, the notification system 100 will retrieve information about the secondary recipients in the database based on the user ID or device ID. At step 430, the notification system 100 decides whether there is any secondary recipient configured for the primary recipient. If yes, at step 440, the notification system sends the abnormal event notification to the secondary recipient 450 according to the secondary recipient's ID recorded in the database. Otherwise, do nothing, i.e. step 460. Here, the secondary recipient can be the parents of the primary recipient; it also can be other close family member, a friend, a guardian or any other person that is set up in the notification setting of the primary recipient's user equipment. The secondary recipient is the person who needs to be notified when the primary recipient is within an area of an emergency situation.

Figure 5B:
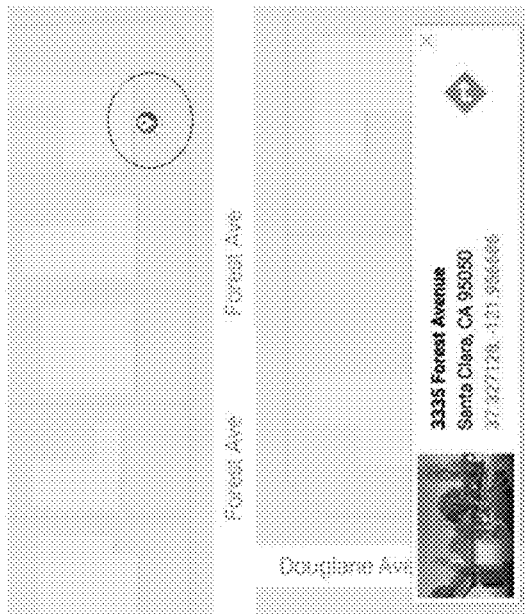
FIGS. 5A-5D illustrate examples of Google® APIs for location recognition according to one embodiment of the present disclosure.
Figure 5D:
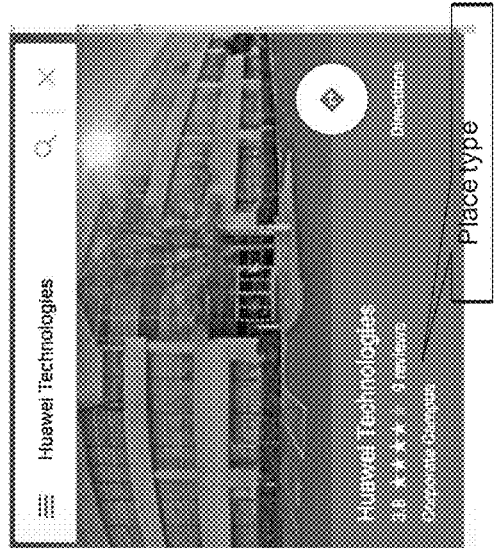
Figure 5A:
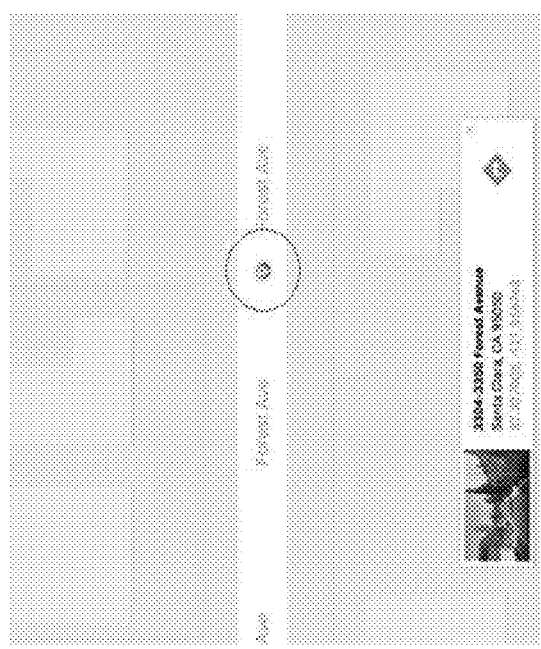
Figure 5C:
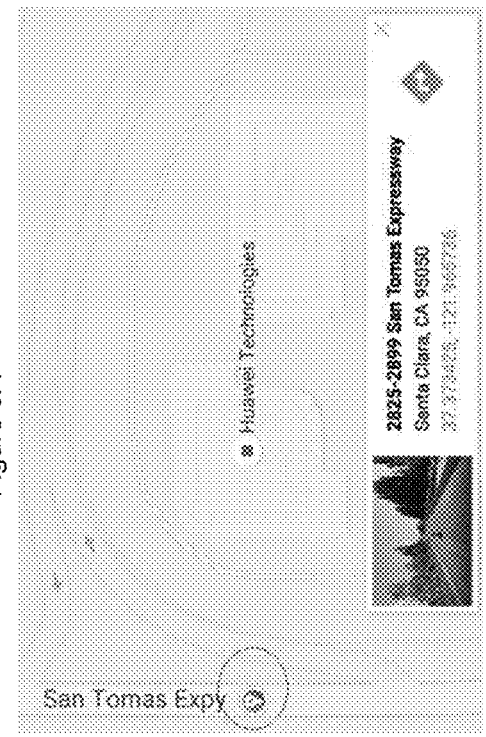

FIGS. 5A-5D illustrate some examples of Google® APIs for location recognition according to one embodiment of the present disclosure. The location recognition includes the road information, the road type and the place type. FIG. 5A shows that the subject is on a local road; FIG. 5B shows that the subject is around a building near a local road; FIG. 5C shows that the subject is on an express way, which is near a company; FIG. 5D shows the place type of the company is "corporate campus." All these information can be used to decide the location of the abnormal event or the potential recipients.

Figure 6:
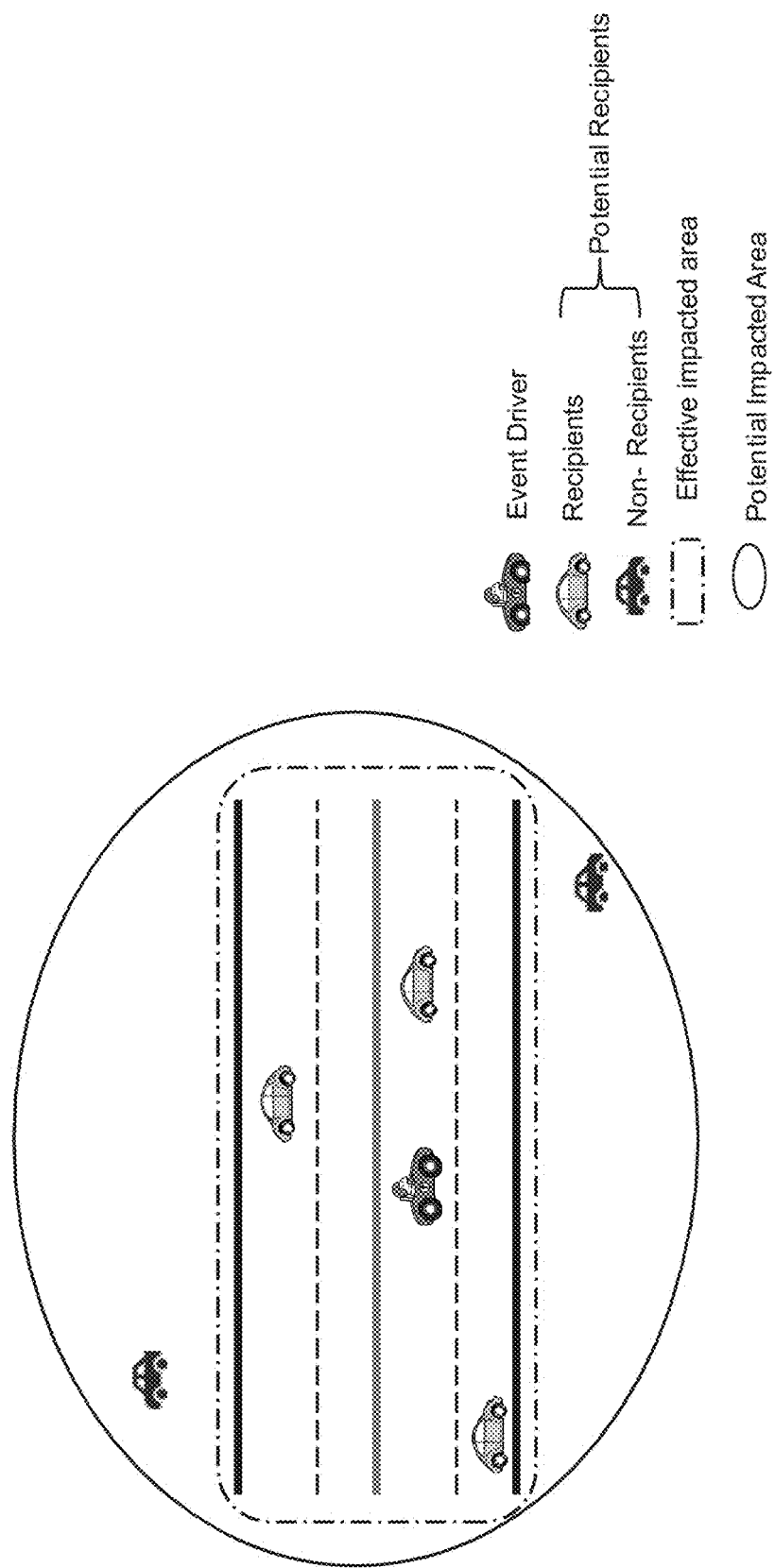
FIG. 6 illustrates an example of Effective Impacted Area (EIA) according to one embodiment of the present disclosure.

FIG. 6 illustrates an example of Effective Impacted Area (EIA) according to one embodiment of the present disclosure. According to FIG. 5, when the abnormal event happened on a highway, although the Potential Impacted Area (PIA) may be a circle, an oval, or any other shape, according to the abnormal event type or the covered area of one or more base stations that served the abnormal event driven vehicle. However, the abnormal event driven vehicle may actually only affect the area of the current highway that the abnormal event is happening (no traffic light, no intersection, no pedestrian and etc.). Other road within the PIA may not be affected or has very little chance to be affected. Thus, according to the location, direction and the speed of an abnormal event, for example a drunk driving, the EIA may be a rectangle shape that cover the highway in a certain distance, and only vehicles under this rectangle covering area will be selected as recipients to be notified. Which means all recipients to be notified should be within the scope of the EIA, and all PIA mentioned above in FIGS. 1-4 should be replaced by this EIA.

Figure 7:
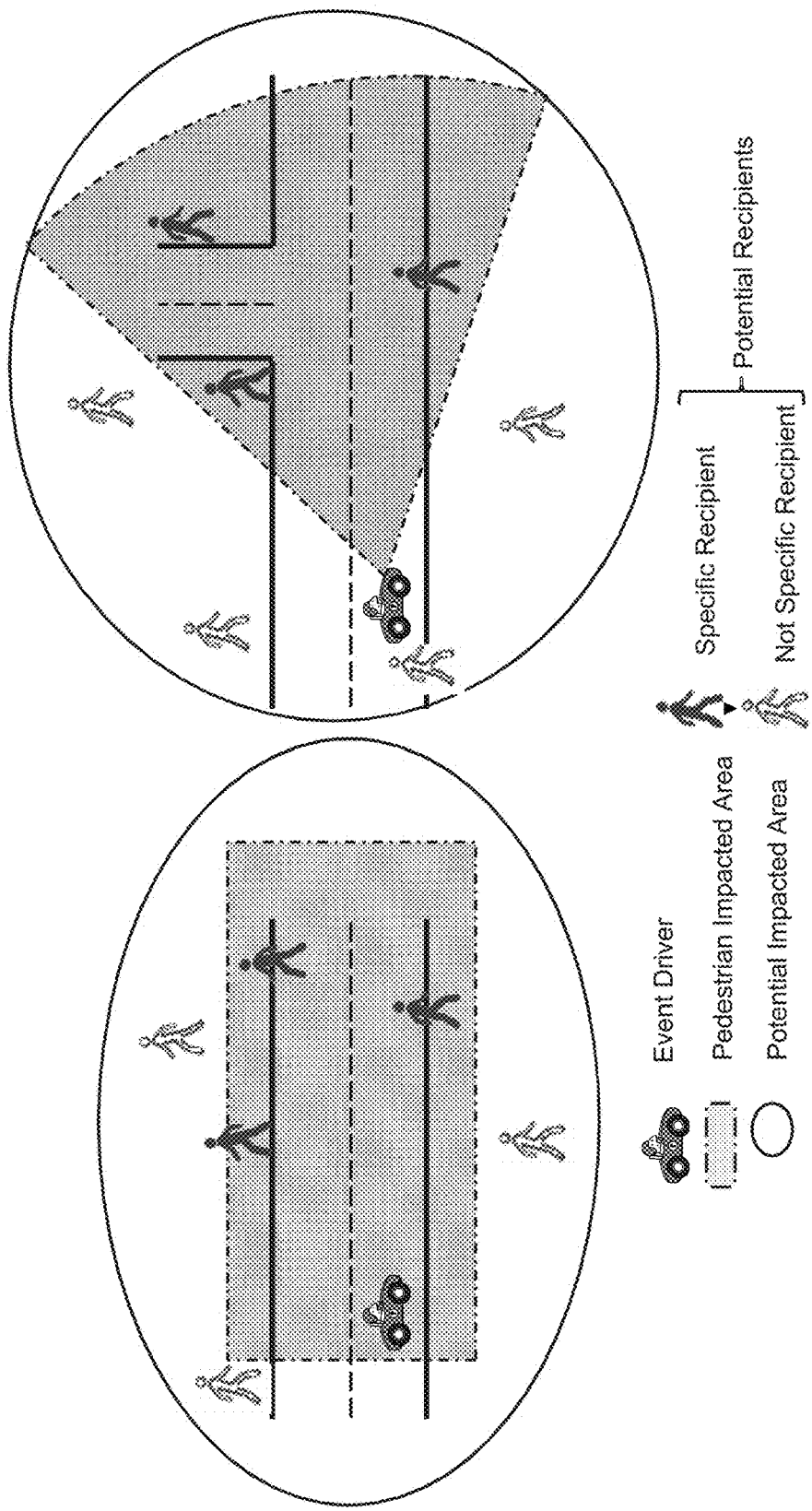
FIG. 7 illustrates another example of EIA according to one embodiment of the present disclosure.

FIG. 7 illustrates another example of EIA according to one embodiment of the present disclosure. For an abnormal event happened on a local road, again the PIA may be a circle, an oval shape, or any other shape, according to the abnormal event type or the covered area of one or more base stations that served the abnormal event driven vehicle. However, the abnormal event driven vehicle may actually only affect the pedestrians walking within a specific area along the current road where the abnormal event is happening. Or if the abnormal event driven vehicle is near a intersection of two local roads, the affected area to the pedestrians may be a sectional area radiated from the abnormal event driven vehicle in one direction.

Figure 8:
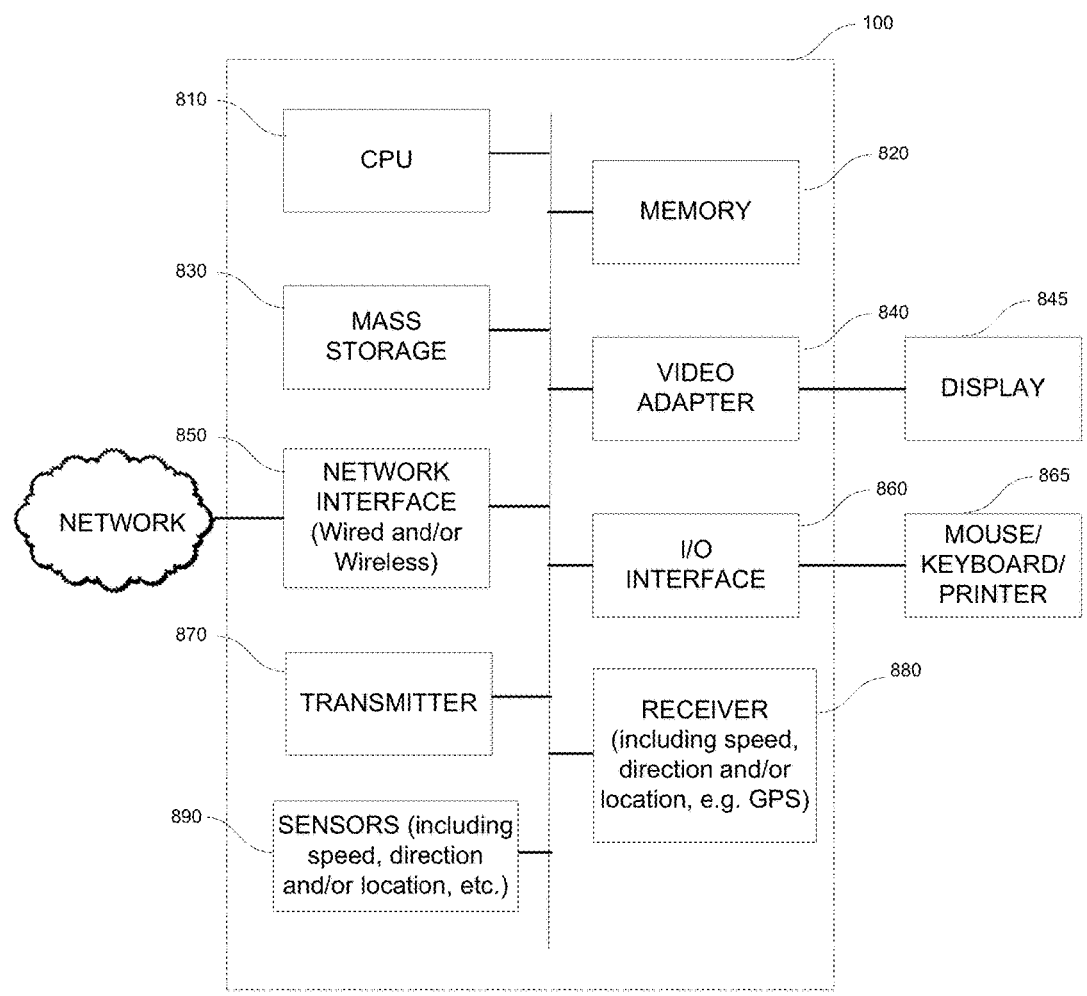
FIG. 8 illustrates a block diagram of notification system or user equipment performing the notification selection according to one embodiment of the present disclosure.

FIG. 8 illustrates a block diagram of notification system or user equipment 800 performing the notification selection according to one embodiment of the present disclosure. The notification system maybe a group of servers providing cloud service in one embodiment. In an alternative embodiment, the notification system may be disposed within and a part of an automobile. The user equipment may be a smart vehicle or a mobile device. Specific notification system or user equipment may utilize all of the components shown, or only a subset of the components and levels of integration may vary from device to device. Furthermore, a system or device may contain multiple instances of a component, such as multiple processors, memories, transmitters, receivers, etc.

As shown, the notification system or user equipment 800 includes a Central Processing Unit (CPU) 810, a memory 820, a mass storage 830, a video adapter 840, a network interface 850, Input/Output interface 860, a transmitter 870, a receiver 880 and a plurality of sensors 890 connected to a bus. The sensors 890 are optional and are included for those embodiments for which notification system 100 is at least partially disposed within an automobile. The arrangement of these components may or may not be as shown in FIG. 8.

The bus may be one or more of any type of several bus architectures including a memory bus or memory controller, a peripheral bus, video bus, or the like. The CPU 810 may comprise any type of electronic data processor adapted to perform computations and/or other processing related tasks. The memory 820 may be any component or collection of components adapted to store programming and/or instructions for execution by the CPU 810. In an embodiment, the memory 820 includes a non-transitory computer readable medium storing programming for execution by the processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage 830 may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The notification system or user equipment 800 also includes one or more network interfaces 850, which may comprise wired links, such as an Ethernet cable or the like, and/or wireless links to base stations or different networks. The network interface 850 allows the processing unit to communicate with remote units via the networks. For example, the network interface may provide wireless communication via one or more transmitters/transmit antennas 870 and one or more receivers/receive antennas 880. In an embodiment, the processing unit is coupled to a local-area network or a wide-area network for data processing and communications with remote devices, such as other processing units, the Internet, remote storage facilities, or the like. Or, the plurality of sensors 890 may detect all or some of the information by themselves. It is also well known to the people skilled in the art that the transmitter 870 and the receiver 880 may be integrated as a transceiver.

The notification system or user equipment 800 also includes a video adapter 840 and an Input/Output interface 860 provides interfaces to couple external input and output devices to the processing unit. As illustrated, examples of input and output devices include the display 845 coupled to the video adapter 840 and the mouse/keyboard/printer 865 coupled to the Input/Output interface 860. Other devices may be coupled to the processing unit, and additional or fewer interface cards may be utilized. For example, a serial interface card (not shown) may be used to provide a serial interface for a printer.

According to one embodiment of the present disclosure, the receiver 880 receives the information about location, speed, direction, notification settings, and behavior history of the abnormal event or the potential recipients from a GPS, a base station, or remote sensors of a detection system via a wired or wireless network. The plurality of sensors 890, including a GPS, a speedometer, an orientation sensor, and etc. may also detect all of some of the above information. All detected or received information may be stored in the memory 820. The CPU 810 calculates the impacted area according to the information stored in the memory 820. The CPU 810 may also decide the type of the abnormal event according to the information stored in the memory 820 and decide which recipient need to be notified according to the notification criteria stored in the memory 820 or the mass storage 830 or adaptively calculated by the CPU 810. The transmitter 870 transmits the notification to the selected recipients via the wireless network.

It should be appreciated that one or more steps of the embodiment methods provided herein may be performed by corresponding units or modules. For example, a signal may be generated by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as FPGAs or ASICs.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method performed by a notification system, comprising:
   receiving and storing abnormal event information in a memory of the notification system, wherein the abnormal event information includes at least one of an event identifier, a location, a speed, a direction and road information;
   determining, by a processor of the notification system, a latest potential impacted area (PIA) based on the abnormal event information and one or more base stations;
   creating, by the processor of the notification system, a list of potential recipients within the latest PIA;
   adjusting, by the processor of the notification system, the latest PIA to a latest Effective Impacted Area (EIA), wherein the adjustment is based on at least one of the location of a vehicle of an abnormal event of the abnormal event information, the speed of the vehicle, a radiated direction of potential hazards from the vehicle, and the road information of the abnormal event information;
   selecting from the list of potential recipients, by the processor of the notification system, at least one recipient to be notified according to a selection criterion specified in the memory, wherein the selection criterion is based on information of potential recipients, including at least one of notification configuration, notification log, a location, a speed, a direction and behavior history of the potential recipients; and
   sending, by a transmitter of the notification system, an abnormal event notification to the at least one recipient.

2. The method of claim 1, further comprising:
   deciding whether the abnormal event has stopped; and
   sending a corresponding notification to the at least one recipient.

3. The method of claim 1, further comprising:
   setting a time interval; and
   updating the abnormal event information after the time interval.

4. The method of claim 1, wherein selecting from the list of potential recipients, by the processor of the notification system, the at least one recipient to be notified according to the selection criterion comprises:
selecting the at least one recipient to be notified upon deciding that the at least one recipient is configured to receive notification when the at least one recipient is located within the latest PIA.

5. The method of claim 1, wherein selecting from the list of potential recipients, by the processor of the notification system, the at least one recipient to be notified according to the selection criterion comprises:
deciding whether the abnormal event is on a highway based on the abnormal event information;
deciding whether the at least one recipient is on the highway based on the information of potential recipients upon deciding that the abnormal event is on the highway; and
selecting the at least one recipient to be notified upon deciding that the at least one recipient is on the highway.

6. The method of claim 1, wherein selecting from the list of potential recipients, by the processor of the notification system, the at least one recipient to be notified according to the selection criterion comprises:
deciding whether the abnormal event is on a local way based on the abnormal event information;
deciding whether the at least one recipient is driving based on the information of potential recipients upon deciding that the abnormal event is on the local way; and
selecting the at least one recipient to be notified upon deciding that the at least one recipient is driving.

7. The method of claim 6, wherein selecting from the list of potential recipients, by the processor of the notification system, the at least one recipient to be notified according to the selection criterion comprises:
deciding whether the at least one recipient is in a place based on information related with the at least one recipient upon deciding that the at least one recipient is not driving; and
selecting the at least one recipient to be notified upon deciding that the at least one recipient is not in the place.

8. The method of claim 7, wherein selecting from the list of potential recipients, by the processor of the notification system, the at least one recipient to be notified according to the selection criterion comprises:
deciding whether the at least one recipient is about to leave the place according to whether the place is a long stay place and the behavior history of the at least one recipient upon deciding that the at least one recipient is in the place; and
selecting the at least one recipient to be notified upon deciding that the at least one recipient is about to leave the place.

9. The method of claim 8, wherein selecting from the list of potential recipients, by the processor of the notification system, the at least one recipient to be notified according to the selection criterion comprises:
checking the location of the at least one recipient periodically upon deciding that the at least one recipient is not about to leave;
updating the latest EIA upon deciding that the at least one recipient is out of the place;
deciding whether the at least one recipient is in the updated latest EIA; and
selecting the at least one recipient to be notified upon deciding that the at least one recipient is in the latest PIA.

10. The method of claim 9, wherein selecting from the list of potential recipients, by the processor of the notification system, the at least one recipient to be notified according to the selection criterion comprises:
setting a timer; and
updating the location of the at least one recipient periodically before the timer expires.

11. The method of claim 1, further comprises:
creating a list of potential recipients within the latest PIA comprises creating a list of potential recipients within the EIA.

12. The method of claim 1, further comprises:
sending, by the transmitter of the notification system, the abnormal event notification to a secondary receipt associated with the at least one recipient.

13. The method of claim 1, wherein the location is received from a GPS (Global Positioning System).

14. A notification system, comprising:
a non-transitory memory storage comprising instructions and an abnormal event information, wherein the abnormal event information includes at least one of an event description or identifier, a location, a speed, a direction and road information; and
one or more processors in communication to the memory, wherein the one or more processors execute the instructions to:
determine a latest potential impacted area (PIA) based on the abnormal event information and one or more base stations;
create a list of potential recipients within the latest PIA;
adjust the latest PIA to a latest Effective Impacted Area (EIA), wherein the adjustment is based on at least one of the location of a vehicle of an abnormal event of the abnormal event information, the speed of the vehicle, a radiated direction of potential hazards from the vehicle, and the road information of the abnormal event information;
select recipients to be notified from the list of potential recipients according to a selection criterion, wherein the selection criterion is based on information of the potential recipients, including at least one of notification configuration, notification log, a location, a speed, a direction and behavior history of the potential recipients stored in the non-transitory memory storage; and
a transmitter in communication with the one or more processors, wherein the transmitter transmits an abnormal event notification to the selected recipients.

15. A method performed by a user equipment, comprising:
storing, by a processor of the user equipment, abnormal event information in a memory of the user equipment, wherein the abnormal event information includes at least one of an event identifier, a location, a speed, a direction, a latest potential impacted area (PIA) and road information;
creating, by the processor of the user equipment, a list of potential recipients within the latest PIA;
adjusting, by the processor of the user equipment, the latest PIA to a latest Effective Impacted Area (EIA), wherein the adjustment is based on at least one of the location of a vehicle of an abnormal event of the abnormal event information, the speed of the vehicle, a radiated direction of potential hazards from the vehicle, and the road information of the abnormal event information;

deciding, by the processor of the user equipment, whether to display an abnormal event notification according to a selection criterion specified in the memory, wherein the selection criterion is based on information of the user equipment, including at least one of notification configuration, notification log, a location, a speed, a direction, and behavior history of the potential recipients; and displaying, on a screen and by the processor of the user equipment, the abnormal event notification upon deciding to display the abnormal event notification according to the selection criterion.

16. The method of claim 15, wherein deciding whether to display an abnormal event notification according to a selection criterion comprises:

deciding to display the abnormal event notification if the user equipment is configured to receive notification when the user equipment is located within the latest EIA.

17. The method of claim 15, wherein deciding whether to display an abnormal event notification according to a selection criterion comprises:

deciding whether the abnormal event is on a highway based on the abnormal event information;

deciding whether the user equipment is on the highway based on the information of the user equipment upon deciding that the abnormal event is on highway; and deciding to display the abnormal event notification if the user equipment is on the highway.

18. The method of claim 15, wherein deciding whether to display an abnormal event notification according to a selection criterion comprises:

deciding whether the abnormal event is on local way based on the abnormal event information;

deciding whether user of the user equipment is driving based on the information of the user equipment upon deciding that the abnormal event is on a local road; and deciding to display the abnormal event notification if user of the user equipment is driving.

19. The method of claim 18, wherein deciding whether to display an abnormal event notification according to a selection criterion comprises:

deciding whether the user equipment is located in a place based on the information of the user equipment upon deciding that the user of the user equipment is not driving; and deciding to display the abnormal event notification if the user equipment is not located in a place.

20. The method of claim 19, wherein deciding whether to display an abnormal event notification according to a selection criterion comprises:

deciding whether user of the user equipment is about to leave the place according to whether the place is a long stay place and behavior history of the user of the user equipment upon deciding that the user is in a place; and deciding to display the abnormal event notification if user of the user equipment is about to leave the place.

21. The method of claim 20, wherein deciding whether to display an abnormal event notification according to a selection criterion comprises:

checking the location of the user equipment periodically upon deciding that the user of the use equipment is not about to leave;

receiving the latest EIA upon deciding that the user equipment is out of the place;

deciding whether the user equipment is in the updated latest EIA; and deciding to display the abnormal event notification if user of the user equipment is in the latest EIA.

22. The method of claim 21, wherein deciding whether to display an abnormal event notification according to a selection criterion comprises:

setting a timer; and updating the location of the user equipment periodically before the timer expires.

23. The method of claim 15, further comprises:

sending, a secondary receipt configuration to a notification system.

24. The method of claim 15, wherein the location is received from a GPS (Global Positioning System).

25. An user equipment, comprising:

a non-transitory memory storage comprising instructions and an abnormal event information, wherein the abnormal event information includes at least one of an event description or identifier, a location, a speed, a direction, a latest potential impacted area (PIA) and road information; and one or more processors in communication with a screen and to the memory, wherein the one or more processors execute the instructions to:

create a list of potential recipients within the latest PIA;

adjust the latest PIA to a latest Effective Impacted Area (EIA), wherein the adjustment is based on at least one of the location of a vehicle of an abnormal event of the abnormal event information, the speed of the vehicle, a radiated direction of potential hazards from the vehicle, and the road information of the abnormal event information;

decide whether to display an abnormal event notification according to a selection criterion specified in the memory; and display, on the screen, an abnormal event notification according to the selection criterion specified in the memory, wherein the selection criterion is based on information of the user equipment, including at least one of notification configuration, notification log, a location, a speed, a direction and behavior history of the potential recipients.

* * * * *